(12) United States Patent
Yamamoto et al.

(10) Patent No.: US 8,332,823 B2
(45) Date of Patent: Dec. 11, 2012

(54) APPLICATION PROGRAM VERIFICATION SYSTEM, APPLICATION PROGRAM VERIFICATION METHOD AND COMPUTER PROGRAM

(75) Inventors: Yuuki Yamamoto, Yokosuka (JP); Tomooki Ukiana, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 1778 days.

(21) Appl. No.: 11/396,451

(22) Filed: Apr. 4, 2006

(65) Prior Publication Data
US 2006/0236114 A1    Oct. 19, 2006

(30) Foreign Application Priority Data

Apr. 5, 2005 (JP) ............................ P2005-108885

(51) Int. Cl.
G06F 9/44 (2006.01)
G06F 9/445 (2006.01)
H04L 29/06 (2006.01)
(52) U.S. Cl. ......... 717/126; 717/174; 717/177; 713/156
(58) Field of Classification Search ................. None
See application file for complete search history.

(56) References Cited

U.S. PATENT DOCUMENTS

| | | | |
|---|---|---|---|
| 5,692,047 A | 11/1997 | McManis | |
| 5,724,425 A | 3/1998 | Chang et al. | |
| 6,067,575 A | 5/2000 | McManis et al. | |
| 6,070,239 A | 5/2000 | McManis | |
| 6,766,353 B1 * | 7/2004 | Lin et al. | 709/203 |
| 7,584,470 B2 * | 9/2009 | Barker et al. | 717/177 |
| 7,685,596 B1 * | 3/2010 | Webb et al. | 717/177 |
| 7,730,455 B2 * | 6/2010 | Chander et al. | 717/126 |
| 7,827,534 B2 * | 11/2010 | Vetillard et al. | 717/126 |

(Continued)

FOREIGN PATENT DOCUMENTS

EP    0 686 906 A2    12/1995
(Continued)

OTHER PUBLICATIONS

Holzmann, Gerard. Logic Verification of ANSI-C Code with SPIN, Lecture Notes in Computer Science, 2000, pp. 131-147, Retrieved on [Aug. 9, 2012], Retrieved from the Internet: URL<http://www.springerlink.com/content/r1441x6927123n20/fulltext.pdf>.*

(Continued)

Primary Examiner — Thuy Dao
Assistant Examiner — Cheneca Smith
(74) Attorney, Agent, or Firm — Oblon, Spivak, McClelland, Maier & Neustadt, L.L.P.

(57) ABSTRACT

There is provided a means to perform a source-level verification by a third-party organization in a shorter time, while preventing leakage of technology and know-how of an ISV (Independent Software Vendor). An AP (Application Program) verification system is composed of an AP development site and a verification organization connected via a network. An API-in-use (Application Program Interface-in-use) extracting functionality extracts information relating to the API (Application Program Interface) used in a source code. The encryption functionality encrypts the source code. The API-in-use set and the encrypted source code are transmitted to the verification organization by the AP transmitting functionality. The API-in-use validity checking functionality of the verification organization verifies the validity of the API being used. If the API being used is valid, the digital signature functionality provides a digital signature to the encrypted source code. The verified source code encrypted and bearing a digital signature is returned to the AP development site by the verified AP transmitting functionality.

12 Claims, 8 Drawing Sheets

U.S. PATENT DOCUMENTS

| | | | |
|---|---|---|---|
| 8,156,488 B2 * | 4/2012 | Kotamarthi et al. | 717/174 |
| 2002/0053024 A1 | 5/2002 | Hashimoto et al. | |
| 2002/0067833 A1 | 6/2002 | Han et al. | |
| 2002/0131404 A1 * | 9/2002 | Mehta et al. | 370/352 |
| 2002/0183056 A1 * | 12/2002 | Lundblade et al. | 455/425 |
| 2003/0212639 A1 * | 11/2003 | Cronce et al. | 705/57 |
| 2004/0025022 A1 * | 2/2004 | Yach et al. | 713/176 |
| 2004/0143820 A1 * | 7/2004 | Jong | 717/126 |
| 2004/0143831 A1 * | 7/2004 | de Jong | 717/174 |
| 2004/0148502 A1 | 7/2004 | Gollner et al. | |
| 2004/0243821 A1 | 12/2004 | Kim et al. | |
| 2005/0223376 A1 * | 10/2005 | Morris | 717/177 |
| 2006/0161968 A1 * | 7/2006 | Crombie et al. | 726/2 |
| 2006/0168580 A1 * | 7/2006 | Harada et al. | 717/174 |
| 2006/0294368 A1 * | 12/2006 | Adams et al. | 713/156 |
| 2010/0332824 A1 * | 12/2010 | Little et al. | 713/156 |

FOREIGN PATENT DOCUMENTS

| | | |
|---|---|---|
| EP | 0 686 906 A3 | 12/1995 |
| EP | 0 778 522 A2 | 6/1997 |
| EP | 0 778 522 A3 | 6/1997 |
| JP | 4-44176 | 2/1992 |
| JP | 5-334125 | 12/1993 |
| JP | 10-320234 | 12/1998 |
| JP | 2001-109644 | 4/2001 |
| JP | 2001-273169 | 10/2001 |
| JP | 2002-140126 | 5/2002 |
| JP | 2003-337630 | 11/2003 |
| JP | 2004-133793 | 4/2004 |
| KR | 2003-0070450 | 8/2003 |
| WO | WO 02/069118 A2 | 9/2002 |
| WO | WO 02/069118 A3 | 9/2002 |

OTHER PUBLICATIONS

Pao-Ann et al. VERTAF: an application framework for the design and verification of embedded real-time software, IEEE Transactions on Software Engineering, Oct. 2004, pp. 656-674, Retrieved on [Aug. 9, 2012] Retrieved from the Internet: URL<http://ieeexplore.ieee.org/stamp/stamp.jsp?tp=&arnumber=1339277>.*
"True Brew® Process Overview", QUALCOMM Proprietary, Jun. 15, 2004, pp. 1-15.
"Symbian Signed", www.symbian.com., pp. 1-7.
"WHQL Testing—Overview", Microsoft Corporation, 2006, 1 page.
Extended European Search Report issued Feb. 24, 2012, in European Patent Application No. 06251927.7.
Office Action issued Jan. 25, 2011, in Japanese Patent Application No. 2005-108885 (with English-language translation).

* cited by examiner

Fig.4

Debugger.cpp    /18

```cpp
#include <eikenv.h>
#include "Debugger.h"

void DEBUGGER(const char *a, void *arg1, void *arg2, void *arg3)
{
 RFs iFs;
 RFile fp;
 TBuf8<1024> buf;
 _LIT(KFName, "Debugger.txt");

iFs.Connect();
 if(!fp.Open(iFs, KFName, EFileShareAny|EFileWrite))
   {
    int spos = 0;
    fp.Seek(ESeekEnd, spos);
   }
 else
   fp.Replace(iFs, KFName, EFileShareAny|EFileWrite);
 TPtrC8 p((const unsigned char *)a);
 buf.Format(p, arg1, arg2, arg3);
 buf.Append('\n');
 fp.Write(buf);

fp.Close();
 iFs.Close();
}
```

APPLICATION PROGRAM VERIFICATION SYSTEM, APPLICATION PROGRAM VERIFICATION METHOD AND COMPUTER PROGRAM

BACKGROUND OF THE INVENTION

1. Field of the Invention

The present invention relates to an application program verification system, an application program verification method, and a computer program.

2. Related Background of the Invention

Currently, services using JAVA (registered trademark) technology are common, in Japan, as aftermarket Application Programs (referred to as AP or application, hereinafter) which can be downloaded to, and executed on, mobile phone terminals. On the other hand, mobile phones are heading for platformization. Consequrenly, their native applications written in C language, C++, or the like with potential superiority in execution speed and functionality, are beginning to distribute. Although native applications are superior to JAVA in terms of speed and functionality, they have many problems in terms of security, which may produce adverse effect due to execution of an unauthorized AP. Therefore schemes are being considered to prevent distribution of an unauthorized AP when downloading APs for execution on mobile phone terminals.

For example, there is a scheme which requires an AP developer (ISV: Independent Software Vendor) to present a source code of APs and provides a verification certificate to those which have been verified that no unauthorized process is performed (see Japanese Patent Application Laid-Open No. 2002-140126).

Alternatively, a scheme can also be contemplated which requires AP developers to present a binary code of APs, performs black box test in a test-house, and allows those which passed without any problems to be registered into a distribution server.

SUMMARY OF THE INVENTION

However, a method requiring the ISV to disclose the source code as described in the above-mentioned patent literature allows the test-house to have a look around the technology of the ISV, whereby some ISVs may be discouraged and avoid entering the market.

On the other hand, a method of testing the binary code lacks completeness of verification compared with the source-level verification. Enhancing the verification may increase verification workload, which may result in a long-time verification. Therefore, it is concerned that the time period until an ISV can introduce an AP to the native application market for mobile phones after completion of its development may be prolonged, raising the risk that the ISV may miss a business chance.

It is thus an object of the present invention, contemplated in view of the above circumstances, to provide a means to perform a source-level verification by a third-party organization in a shorter time, while preventing leakage of technology and know-how of the ISV.

The present invention is an application program verification system (AP verification system, hereinafter) composed of an application program transmitting device (AP transmitting device, hereinafter) and an application program verification device (AP verification device, hereinafter) which are connected to a network, the AP transmitting device comprising: an application program interface-in-use extracting means (API-in-use extracting means, hereinafter) for extracting information relating to the application program interface (occasionally referred to as API, hereinafter) being used in the source code of the AP; an encryption means for encrypting the source code of the AP; and an application program transmitting means (AP transmitting means, hereinafter) for transmitting the extracted information relating to the API and the encrypted source code to the AP verification device, over the network, and the AP verification device comprising: a verification means for verifying the transmitted information relating to the API; a digital signature means for providing a digital signature to the source code whose information relating to the API has been verified; and a verified application program transmitting means (verified AP transmitting means, hereinafter) for transmitting the source code bearing the digital signature to the network.

According to such an arrangement, since the API-in-use extracting means of the AP transmitting device extracts information relating to the API used in the source code, and the AP transmitting means transmits the information to the AP verification device, the AP verification device can receive information relating to the API-in-use. In addition, since the encryption means of the AP transmitting device encrypts the source code, which is then transmitted by the AP transmitting means to the AP verification device, the AP verification device then receives the encrypted source code, whereby leakage of technology and know-how of the ISV can be prevented. Furthermore, since the detecting means of the AP verification device verifies the transmitted information relating to the API, the source-level verification can be performed in a short time. Additionally, since the digital signature means of the AP verification device provides a digital signature to the source code whose information relating to the API has been verified, and the verified AP transmitting means transmits the source code bearing the digital signature to the network, the verified source code bearing a digital signature can be distributed over the network.

According to another aspect of the invention, there is provided an application program verification method (AP verification method, hereinafter), comprising the steps of: preparing an AP transmitting device and an AP verification device which are mutually connected over a network; extracting information relating to an API used in a source code of an AP and encrypting the source code of the AP in the AP transmitting device; transmitting, to the AP verification device, the extracted information relating to the API and the encrypted source code, over the network; verifying the transmitted information relating to the API in the AP verification device; providing a digital signature to the source code whose information relating to the API has been verified; and transmitting the source code bearing the digital signature to the network.

Furthermore, according to another aspect of the invention, there is provided a computer program executable in an AP transmitting device connected to an AP verification device over a network, wherein the program causes the AP transmitting device to execute the steps of: extracting information relating to an API used in a source code of an AP and encrypting the source code of the AP; and transmitting the extracted information relating to the API and the encrypted source code to the AP verification device, over the network.

According to an AP verification system, an AP verification method and a computer program of the present invention, a source-level verification by a third-party organization can be performed in a shorter time, while preventing leakage of technology and know-how of an ISV.

BRIEF DESCRIPTION OF THE DRAWINGS

FIG. 4 illustrates a source code to be verified in the first embodiment of the present invention.

DESCRIPTION OF THE PREFERRED EMBODIMENTS

In the following, an AP verification system according to an embodiment of the invention will be described, referring to the accompanying drawings. Here, in descriptions of the drawings, same or similar elements are provided with same numerals and duplicate description will be omitted.

Figure 1:
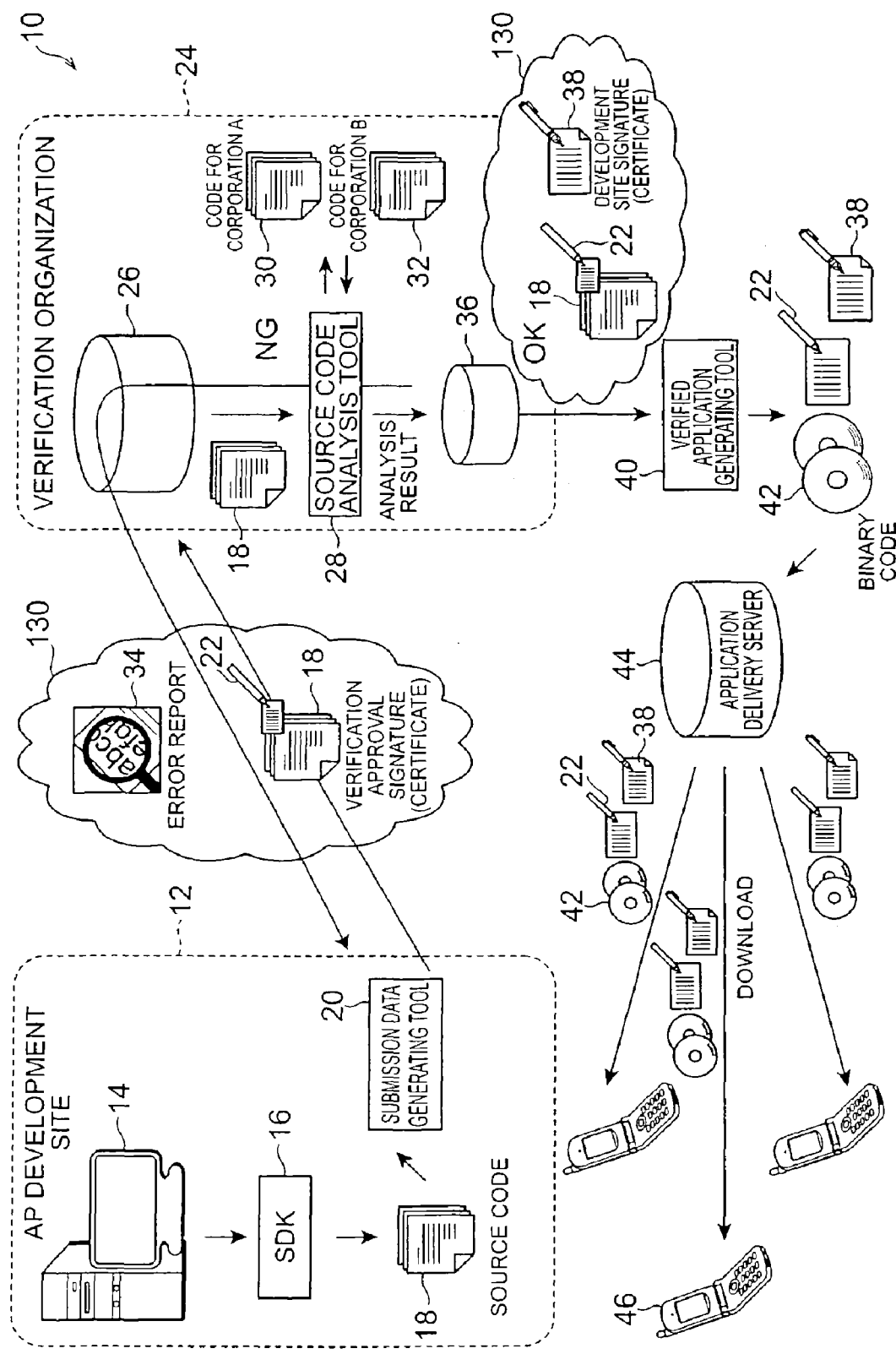
FIG. 1 illustrates an aspect of delivering a verified AP, using an AP verification system according to a first embodiment of the present invention.

First, an outline of delivering an AP which has been verified by an AP verification system according to the present embodiment is described. FIG. 1 illustrates an aspect of delivering a verified AP, using the AP verification system according to the first embodiment of the present invention. An AP verification system 10 of the present embodiment is composed of an AP development site 12 (AP transmitting device) and a verification organization 24 (AP verification device) which are connected via a network 130. At the AP development site 12, an AP developer 14 develops an AP using an SDK (Software Development Kit) 16. A source code 18 of the developed AP will be transmitted over the network 130 to the verification organization 24 as submission data to which a development site signature 22 is provided by a submission data generating tool 20 (computer program) as will be described below.

In the verification organization 24, the submission data is stored in a received-data storage unit 26. As will be described below, the stored submission data is analyzed by a source code analysis tool 28 to verify its validity. Using different data for individual development site, such as code 30 for Corporation A, code 32 for Corporation B, the analysis target is changed on basis of the development site signature 22. In other words, different types of analysis can be performed for individual development site, according to a check policy associated with the development site signature 22.

If any problem was detected as a result of the analysis, an error report 34 describing the details is sent back to the AP development site 12 over the network 130. On the other hand, if no problem was detected, the source code 18 and the like are stored in a verified AP storage unit 36. Then, the verified data including the source code 18, the development site signature 22, and the verification approval signature 38 is transmitted to the network 130.

The verified data which is transmitted to the network 130 is rendered into a data including a binary code 42, the development site signature 22, and the verification approval signature 38, by a verified application generating tool 40 running on a computer connected to one end of the network 130. Then, the data including the binary code 42, the development site signature 22, and the verification approval signature 38 is downloaded to a mobile phone 46, by an application delivery server 44.

Figure 2:
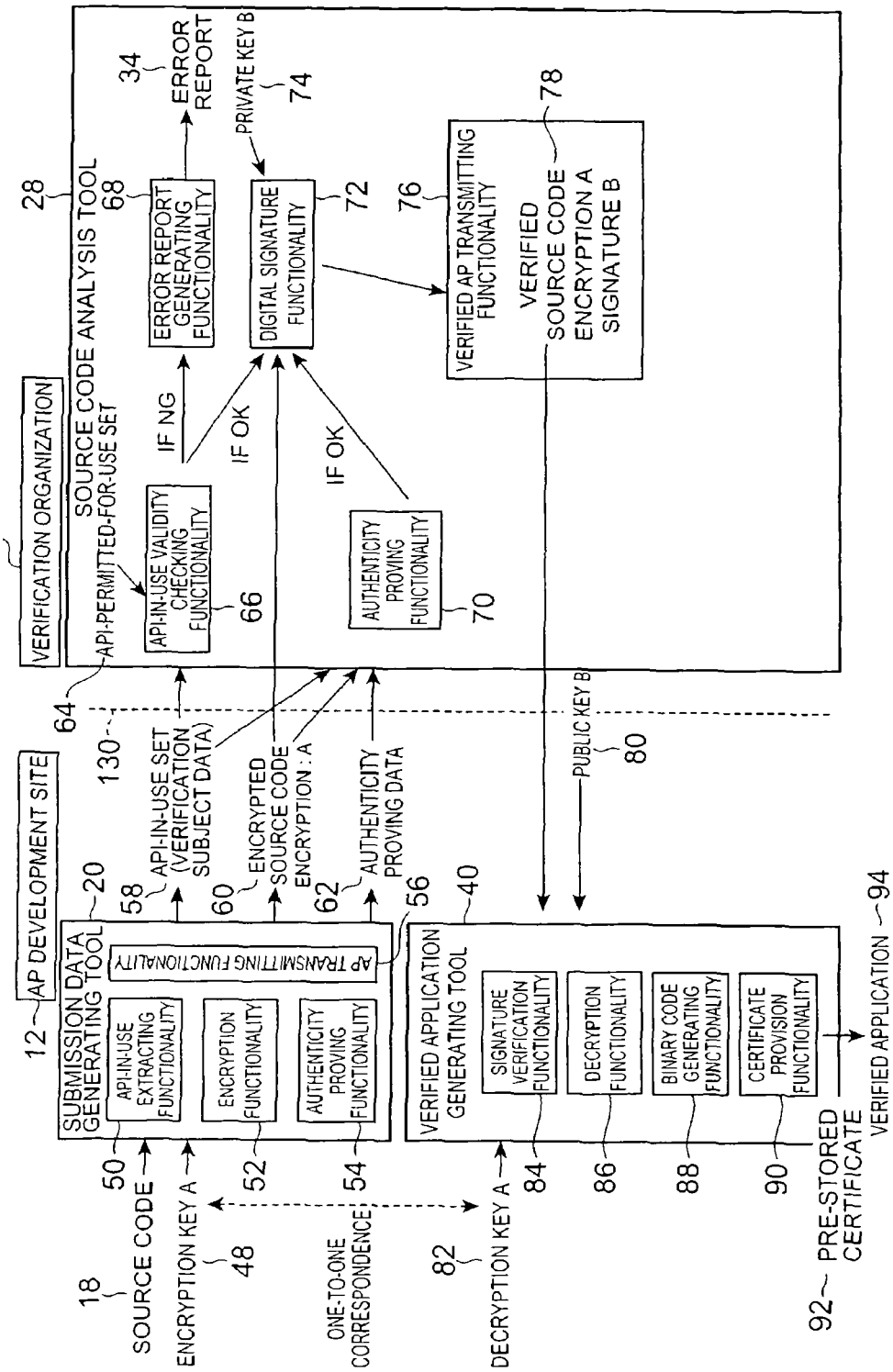
FIG. 2 illustrates an arrangement of the AP verification system according to the first embodiment of the present invention.

The AP verification system of the present embodiment will be described in further detail as follows. FIG. 2 illustrates an arrangement of the AP verification system according to the first embodiment of the present invention. The AP verification system 10 according the present embodiment is physically implemented as computer devices in the AP development site 12 and the verification organization 24, which are connected over the network 130. The illustrated functionalities are adapted to be effective by executing a submission data generating tool 20 in the AP development site 12 and executing a source code analysis tool 28 in the verification organization 24. Here, with the example of FIG. 2, the verified data is adapted to be returned to the AP development site 12, whereby the AP development site 12 can obtain a verified application 94 by executing the verified application generating tool 40.

Execution of the submission data generating tool 20 provides the AP development site 12 with an API-in-use extracting functionality 50 (API-in-use extracting means), an encryption functionality 52 (encryption means), an authenticity proving functionality 54, and an AP transmitting functionality 56 (AP transmitting means). The API-in-use extracting functionality 50 extracts information relating to the API used in the source code 18. In the present embodiment, an API name to be used is extracted from the source code 18.

Figure 5:
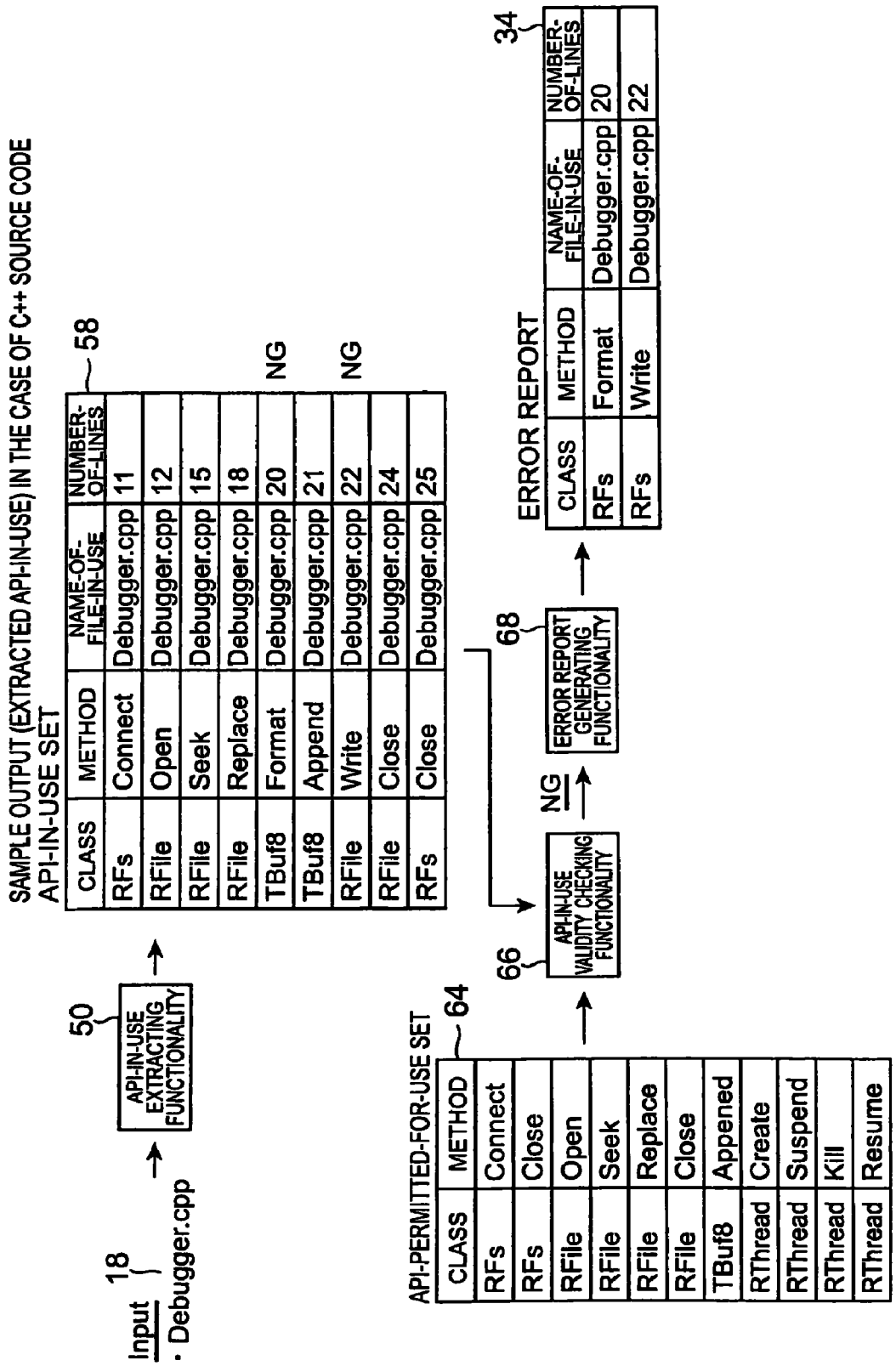
FIG. 5 illustrates an example of extracting an API-in-use and verifying the API-in-use in the first embodiment of the present invention.

FIG. 4 illustrates a source code to be verified in the first embodiment of the present invention, and FIG. 5 illustrates an example of extracting an API-in-use and verifying the API-in-use in the first embodiment of the present invention. In the AP verification system of the present embodiment, an API-in-use set 58 as shown in FIG. 5 is extracted from the source code 18 as shown in FIG. 4, using the API-in-use extracting functionality 50.

Returning to FIG. 2, the encryption functionality 52 encrypts the source code 18 using an encryption key A: 48 and generates an encrypted source code 60. Encryption can be performed according to symmetric-key cryptography such as DES (Data Encryption Standard). In addition, the authenticity proving functionality 54 generates an authenticity proving data 62 from the API-in-use set 58 and the verified source code 60. The authenticity proving data 62 may be a hash value, for example, calculated from the API-in-use set 58 and the encrypted source code 60 by a hash function. The API-in-use set 58, the encrypted source code 60, and the authenticity proving data 62 are transmitted to the verification organization 24 over the network 130 by the AP transmitting functionality 56.

As shown in FIG. 2, execution of the source code analysis tool 28 provides the verification organization 24 with an API-in-use validity checking functionality 66 (verification means), an error report generating functionality 68, an authenticity proving functionality 70, a digital signature functionality 72 (digital signature means), a verified AP transmitting functionality 76 (verified AP transmitting means). The API-in-use validity checking functionality 66 verifies the validity of the API being used by matching the API-in-use set 58 with an API-permitted-for-use set 64.

For example, when matching of the API-permitted-for-use set 64 with the API-in-use set 58 is performed by the API-in-use validity checking functionality 66 as shown in FIG. 5, methods "Format" and "Write" are determined as invalid because they do not exist in the API-permitted-for-use set 64. In this case, an error report 34 indicating the fact is created by the error report generating functionality 68. On the other hand, if all of the APIs of the API-in-use set 58 are included in the API-permitted-for-use set 64, the digital signature functionality 72 provides a digital signature to the encrypted source code 60 according to a private key B: 74, under the condition that the authenticity proving functionality 70 has determined that the data from the AP development site 12 is authentic. The digital signature may be provided according to asymmetric-key cryptography such as RSA.

By matching the hash value calculated, using a hash function, from the API-in-use set 58 and the encrypted source code 60 which have been transmitted from the AP development site 12, with the hash value of the authenticity proving data 62, the authenticity proving functionality 70 can verify that the transmitted data has not been tampered with.

The verified source code 78, encrypted with the encryption key A: 48 and bearing a digital signature provided via the private key B: 74, is returned to the AP development site 12 over a network not shown, by the verified AP transmitting functionality 76.

As shown in FIG. 2, execution of the verified application generating tool 40 provides the AP development site 12 with a signature verification functionality 84, a decryption functionality 86, a binary code generating functionality 88, and a certificate provision functionality 90. The signature verification functionality 84 verifies the digital signature by decrypting the private key B: 74 using the public key B: 80. In this manner, it can be proved that the digital signature has not been tampered with, but provided by the verification organization 24. The decryption functionality 86 decrypts, using a decryption key A: 82, the source code which has been encrypted with the encryption key A: 48. The binary code generating functionality 88 generates a binary code from the decrypted source code. The certificate provision functionality 90 provides the binary code with a certificate 92 pre-stored in the verified application generating tool 40 and generates a verified application 94.

Figure 7:
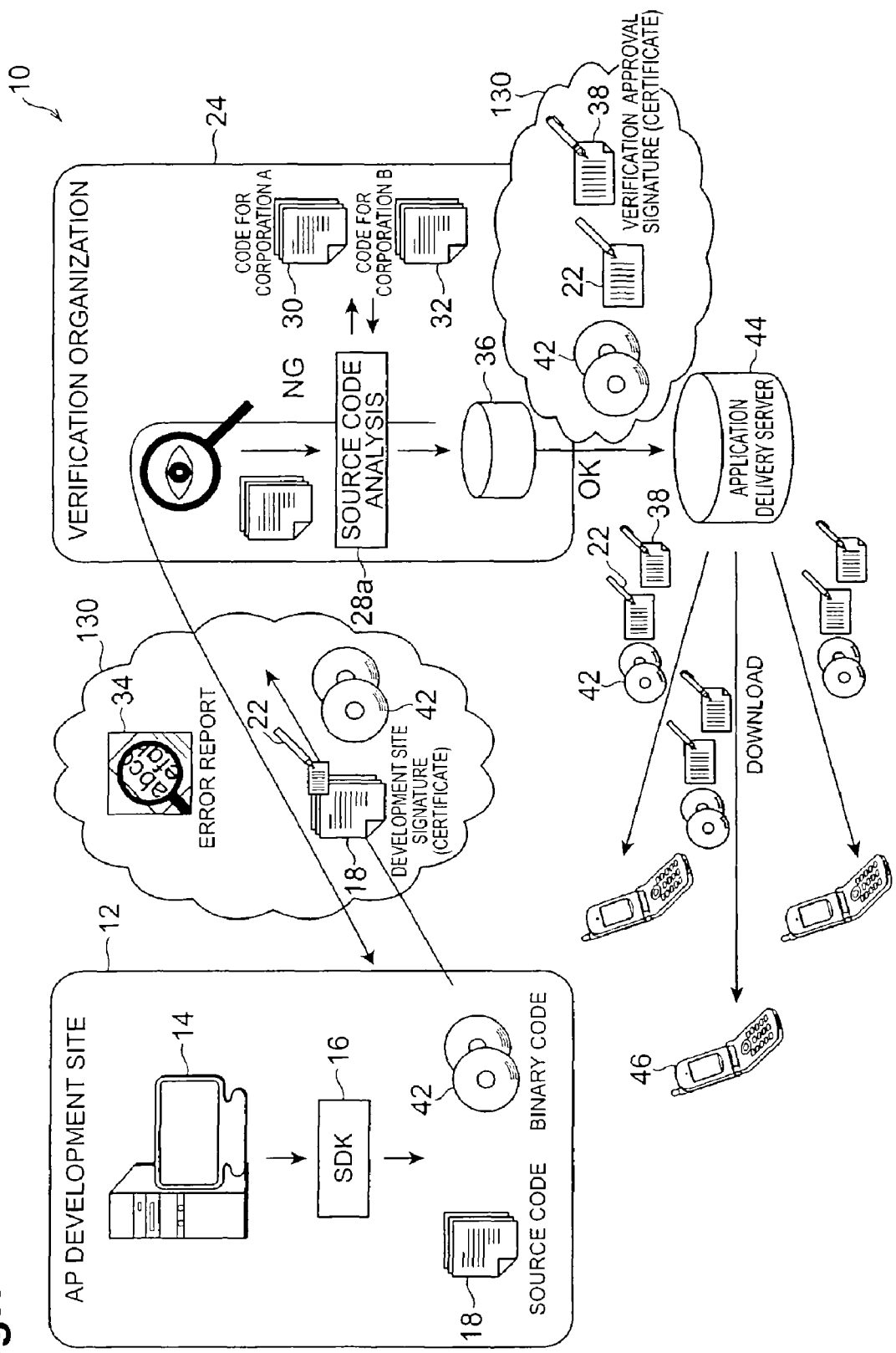
FIG. 7 illustrates an aspect of delivering a verified AP using a conventional AP verification system.
Figure 8:
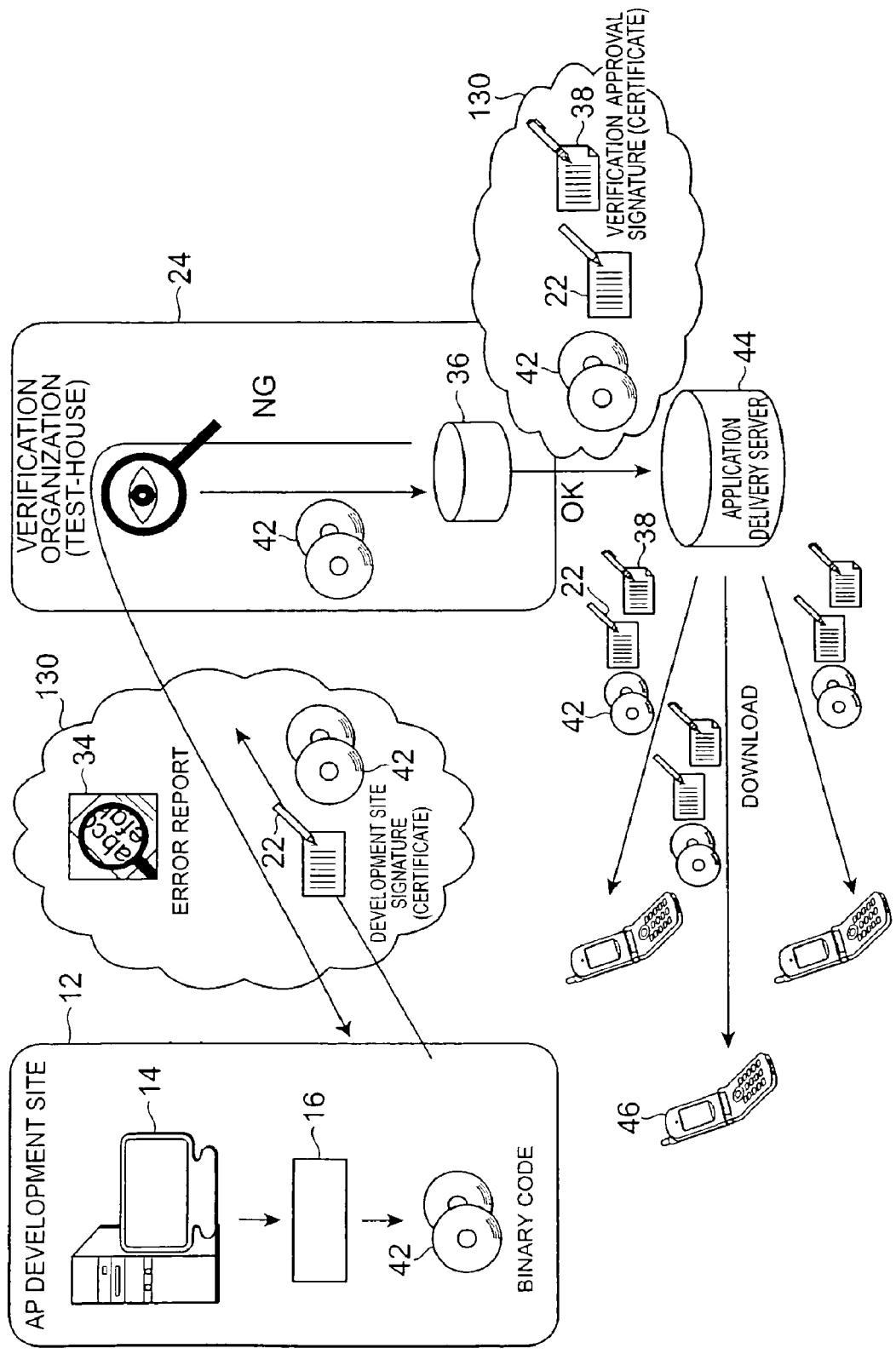
FIG. 8 illustrates an aspect of delivering a verified AP using a conventional AP verification system.

The operation and effect of the AP verification system of the present embodiment will be described below. FIGS. 7 and 8 illustrate an aspect of delivering the verified AP using a conventional AP verification system.

If source code analysis 28a for yet-to-be-encrypted source code is manually performed as shown in FIG. 7, there exists the risk of information leakage by the tester or the code viewer. In addition, verification time tends to be longer due to verification by the tester. With regard to thoroughness of the verification, there exists a shortcoming in that thoroughness of the verification depends on the tester's skill, although a source code level verification may be possible.

In the case of the black box test using the binary code as shown in FIG. 8, it is superior in view of know-how protection since only the binary code is required to be presented, eliminating contact between the tester and the source code. However, since the black box test requires many processes for assuring completeness of the verification, the verification time tends to be longer. In addition, the black box test has a limited completeness of verification.

With the present embodiment, on the other hand, know-how of the ISV can be protected because the AP development site is required to submit the encrypted source code. In addition, verification time can be shortened because verification is performed on the already extracted API. Furthermore, since verification is performed on the already extracted API, a source code level verification is possible, without depending on the skill of the tester owing to the automated verification using a tool. In addition, since the processes of verification, binary code generation, and registration to the application delivery server can be automated, robustness against occurrence of mistakes or fraud is high, whereby fairness of testing environment is assured.

Figure 3:
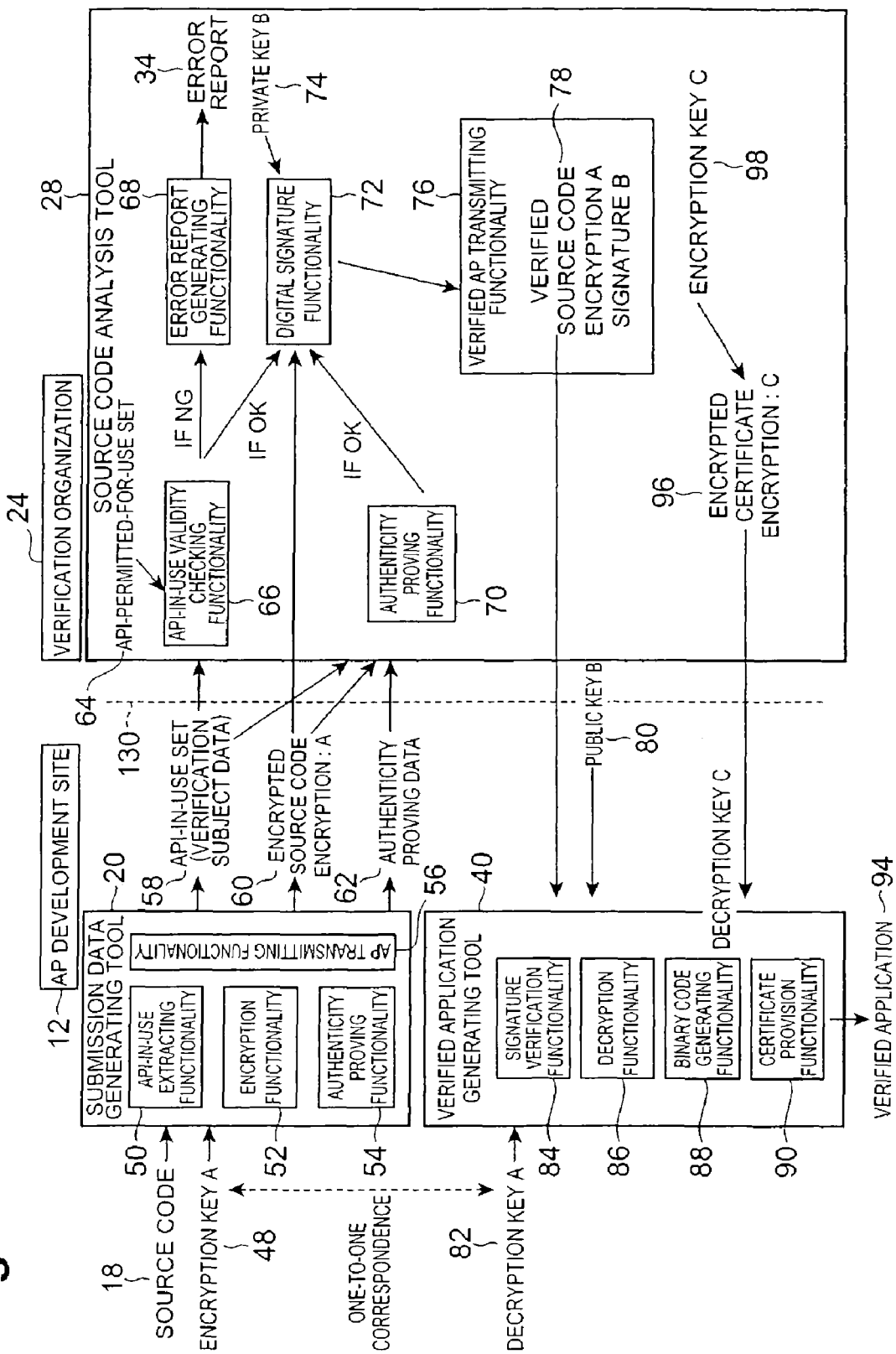
FIG. 3 illustrates an arrangement of an AP verification system according to a second embodiment of the present invention.

FIG. 3 illustrates an arrangement of the AP verification system according to a second embodiment of the present invention. This embodiment is different from the first embodiment in that the certificate provision functionality 90 of the verified application generating tool 40 provides an encrypted certificate 96 transmitted from the verification organization 24, instead of providing a certificate pre-stored in the verified application generating tool 40. In the verification organization 24, the certificate 96 is encrypted using an encryption key C: 98 and transmitted to the AP development site 12. At the AP development site 12, the encrypted certificate 96 is decrypted by a decryption key C: 100 in the verified application generating tool 40 and provided to the verified application 94.

With the above-mentioned aspect, the risk of leakage of the certificate itself can be reduced because the certificate is provided from the verification organization in an already encrypted form. In addition, individual certificate is issued according to the verification level and the content so that certificates can be appropriately used on a purpose-basis.

Figure 6:
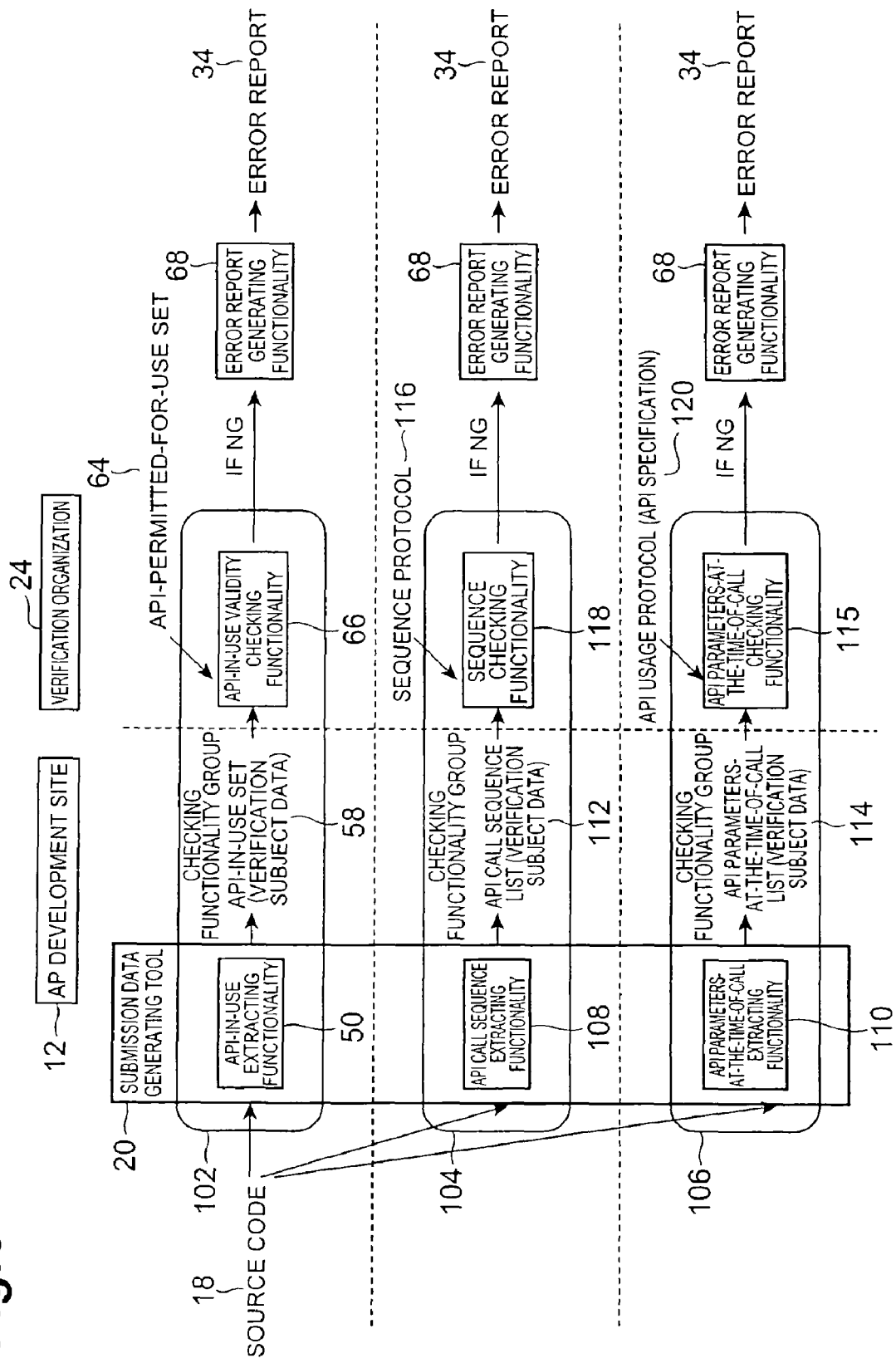
FIG. 6 illustrates verification subjects of the API-in-use to be verified in an AP verification system according to a third embodiment of the present invention.

FIG. 6 illustrates verification subjects of the API-in-use to be verified in an AP verification system according to a third embodiment of the present invention. This embodiment is different from the first and the second embodiments in that a plurality of groups of check functionalities 102, 104 and 106 perform verification of plural types of subjects. In the checking functionality group 102, as with the first and the second embodiments, the submission data generating tool 20 of AP development site 12 extracts the API-in-use set 58 using the API-in-use extracting functionality 50, and the verification organization 24 examines, with the API-in-use validity checking functionality 66, whether or not an API other than those permitted for use is called.

In the checking functionality group 104, the submission data generating tool 20 of the AP development site 12 extracts an API call sequence list 112 using an API call sequence extracting functionality 108, and the verification organization 24 examines, using a sequence checking functionality 118, whether or not the API call sequence satisfies a sequence rule by matching the API call sequence list 112 and a sequence protocol 116. In the checking functionality group 106, the submission data generating tool 20 of the AP development site 12 extracts an API parameters-at-the-time-of-call list 114 using an API parameters-at-the-time-of-call extracting functionality 110, and the verification organization 24 examines, using an API-parameters-at-the-time-of-call checking functionality 115, whether or not the parameters at the point of calling the API is within the range of the rule, by matching the API parameters-at-the-time-of-call list 114 and an API usage protocol 120 (API specification). For example, a static checking of an argument having an upper or lower limit, or a parameter type restriction checking of a void argument may be performed. With this aspect, a wider variety of verification with regard to an AP can be performed by providing various kinds of checking functionality groups.

It is needless to say that the AP verification system, AP verification method and the computer program of the present invention are not limited by the above-mentioned embodiments, and various modifications can be made without departing from the spirit of the present invention.

What is claimed is:

1. An application program verification method comprising:
    preparing an application program transmitting device and an external application program verification device which are mutually connected via a network;
    in the application program transmitting device,
    extracting information relating to an application program interface used in a source code of an application program, the information including the application program interface used in the source code, a call sequence of the application program interface, and parameters-at-the-time-of-call of the application program interface, and supported by a plurality of mobile phones, and encrypting the source code of the application program; and
    transmitting the extracted information relating to the application program interface and the encrypted source code to the external application program verification device, via the network;
    in the external application program verification device,
    verifying the information relating to the application program interface received from the application program transmitting device, the verification including validity checking of the application program interface used in the source code, verification of whether the call sequence of the application program interface satisfies a sequence rule, and verification of whether the parameters-at-the-time-of-call of the application program interface are within a range of a rule;
    providing a digital signature to the encrypted source code when information relating to the application program interface has been verified; and
    transmitting the encrypted source code bearing the digital signature to the application program transmitting device via the network; and
    further in the application program transmitting device,
    generating a verified application based on the received encrypted source code bearing the digital signature and a previously stored certificate, and
    transmitting the verified application to the plurality of mobile phones configured to support the application program interface of the application program.

2. An application program verification method according to claim 1, wherein the verification includes conducting a different type of verification for each application program transmitting device under a checking policy associated with each application program transmitting device.

3. An application program verification system composed of an application program transmitting device, having a processor, and an external application program verification device which are connected via a network, the application program transmitting device comprising:
    an application program interface-in-use extracting means for extracting information relating to an application program interface being used in a source code of an application program, the information including the application program interface used in the source code, a call sequence of the application program interface, and parameters-at-the-time-of-call of the application program interface, and supported by a plurality of mobile phones;
    an encryption means for encrypting the source code of the application program; and
    an application program transmitting means for transmitting the extracted information relating to the application program interface and the encrypted source code to the external application program verification device, via the network,
    the external application program verification device comprising:
    a verification means for verifying the extracted information relating to the application program interface received from the application program transmitting means, the verification including validity checking of the application program interface used in the source code, verification of whether the call sequence of the application program interface satisfies a sequence rule, and verification of whether the parameters-at-the-time-of-call of the application program interface are within a range of a rule;
    a digital signature means for providing a digital signature to the encrypted source code when extracted information relating to the application program interface has been verified; and
    a verified application program transmitting means for transmitting the encrypted source code bearing the digital signature to the application program transmitting device via the network, and
    the application program transmitting device further comprising:
    a verified application generating means for generating a verified application based on the received encrypted source code bearing the digital signature and a previously stored certificate, and for transmitting the verified application to the plurality of mobile phones configured to support the application program interface of the application program.

4. An application program verification system according to claim 3, wherein the verification means compares the transmitted information relating to the application program interface to a permitted application program interface-in-use set, verifies the transmitted information relating to the application program interface when the transmitted information relating to the application program interface is included in the permitted application program interface-in-use set.

5. An application program verification system according to claim 4, wherein the verifying means generates an error when a portion of the transmitted information relating to the application program interface is not included in the permitted application program interface-in-use set; and the application program verification device further comprising:
    an error report generating means for detecting the error from the verifying means and for generating an error report including the detected error to be sent to the application program transmitting device.

6. An application program verification system according to claim 4, the application program transmitting device further comprising:
    an authenticity data proving means for generating authenticity proving data based on the extracted information relating to the application program interface and the encrypted source code,
    wherein the application program transmitting means transmits the generated authenticity proving data to the application program verification device; and
    the application program verification device further comprising:
    an authenticity proving means for determining whether the data transmitted from the application program transmitting means is authentic based on the received authenticity proving data and a calculated authenticity data,
    wherein the digital signature means for providing the digital signature to the source code when the authenticity proving means determines that the data transmitted from the application program transmitting means is authentic.

7. An application program verification system according to claim 3, wherein the verified application generating means includes:
- a signature verification function which verifies the digital signature received from the external application program verification device;
- a decrypting function which decrypts the encrypted source code received from the external application program verification device;
- a binary code generating function which generates a binary code from the decrypted source code; and
- a certificate provision function which provides the binary code with the previously stored certificate to generate the verified application.

8. An application program verification system according to claim 3, wherein the previously stored certificate is stored at and received from the external application program verification device.

9. An application program verification system according to claim 3, wherein the previously stored certificate is stored at the application program transmitting device.

10. An application program verification system according to claim 3, wherein the previously stored certificate indicates that the application program does not include processes which are unauthorized for the plurality of mobile phones.

11. An application program verification system according to claim 3, wherein the verification means of the application program verification device conducts a different type of verification for each application program transmitting device under a checking policy associated with each application program transmitting device.

12. A non-transitory computer readable storage medium including computer executable instructions, which when executed by an application program verification device connected to an external application program transmitting device via a network, cause the application program verification device to perform a method comprising:
- verifying information relating to an application program interface used in a source code of an application program extracted by and supported by a plurality of mobile phones, the information including the application program interface used in the source code, a call sequence of the application program interface, and parameters-at-the-time-of-call of the application program interface, and received from the external application program transmitting device via the network, the verification including validity checking of the application program interface used in the source code, verification of whether the call sequence of the application program interface satisfies a sequence rule, and verification of whether the parameters-at-the-time-of-call of the application program interface are within a range of a rule;
- providing a digital signature to the source code of the application program encrypted by and received from the external application program transmitting device via the network, when information relating to the application program interface has been verified; and
- transmitting the encrypted source code bearing the digital signature to the external application program transmitting device via the network,
- wherein the external application program transmitting device generates a verified application based on the received encrypted source code bearing the digital signature and a previously stored certificate, and transmits the verified application to the plurality of mobile phones configured to support the application program interface of the application program.

* * * * *